US011820857B2

(12) United States Patent
Nakashima et al.

(10) Patent No.: US 11,820,857 B2
(45) Date of Patent: Nov. 21, 2023

(54) METHOD FOR PRODUCING OXYMETHYLENE COPOLYMER RESIN COMPOSITION, AND OXYMETHYLENE COPOLYMER RESIN COMPOSITION

(71) Applicant: MITSUBISHI GAS CHEMICAL COMPANY, INC., Tokyo (JP)

(72) Inventors: Mika Nakashima, Mie (JP); Daisuke Sunaga, Tokyo (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 0 days.

(21) Appl. No.: 17/635,192

(22) PCT Filed: Aug. 6, 2021

(86) PCT No.: PCT/JP2021/029252
§ 371 (c)(1),
(2) Date: Feb. 14, 2022

(87) PCT Pub. No.: WO2022/091522
PCT Pub. Date: May 5, 2022

(65) Prior Publication Data
US 2022/0356290 A1 Nov. 10, 2022

(30) Foreign Application Priority Data
Oct. 28, 2020 (JP) ................. 2020-180355

(51) Int. Cl.
| | | |
|---|---|---|
| C08G 2/30 | (2006.01) | |
| B29C 48/00 | (2019.01) | |
| C08K 5/13 | (2006.01) | |
| C08K 5/17 | (2006.01) | |
| C08K 5/3492 | (2006.01) | |
| C08L 59/00 | (2006.01) | |
| C08L 59/04 | (2006.01) | |

(52) U.S. Cl.
CPC .............. *C08G 2/30* (2013.01); *B29C 48/022* (2019.02); *C08K 5/13* (2013.01); *C08K 5/17* (2013.01); *C08K 5/34922* (2013.01); *C08L 59/00* (2013.01); *C08L 59/04* (2013.01)

(58) Field of Classification Search
None
See application file for complete search history.

(56) References Cited

U.S. PATENT DOCUMENTS

| | | | |
|---|---|---|---|
| 2008/0200639 A1 | 8/2008 | Harashina et al. | |
| 2008/0271381 A1* | 11/2008 | Harashina | C08K 5/34 51/298 |
| 2015/0034882 A1 | 2/2015 | Inagaki et al. | |
| 2019/0161433 A1* | 5/2019 | Kondo | C07C 53/10 |

FOREIGN PATENT DOCUMENTS

| | | | |
|---|---|---|---|
| JP | 2004059720 A | * | 2/2004 |
| JP | 2006-306944 A | | 11/2006 |
| JP | 2007-112959 A | | 5/2007 |
| JP | 2013-112727 A | | 6/2013 |
| JP | 2013-237742 A | | 11/2013 |
| JP | 2014-122264 A | | 7/2014 |
| JP | 2014122264 A | * | 7/2014 |
| JP | 2018-24861 A | | 2/2018 |
| WO | WO 2006/098251 A1 | | 9/2006 |
| WO | WO 2013/108834 A1 | | 7/2013 |

OTHER PUBLICATIONS

JP 2004-059720 A, Feb. 2004, Machine translation (Year: 2004).*
JP-2014122264-A, Jul. 2014, Machine translation (Year: 2014).*
ISR for PCT/JP2021/029252, dated Aug. 6, 2021.
Extended European Search Report issued in European Patent Application No. 21848232.1 dated Nov. 24, 2022.

* cited by examiner

*Primary Examiner* — Satya B Sastri
(74) *Attorney, Agent, or Firm* — GREENBLUM & BERNSTEIN, P.L.C.

(57) ABSTRACT

The present invention provides a method for producing an oxymethylene copolymer resin composition, comprising: adding to an oxymethylene copolymer (A), an Mn micromole of an amine-substituted triazine compound (B) per gram of the oxymethylene copolymer (A), an Mc micromole of a choline hydroxide (C) per gram of the oxymethylene copolymer (A), and 0.05 to 1.1 parts by weight of an antioxidant (D) with respect to 100 parts by weight of the oxymethylene copolymer (A), and melt kneading a mixture of the oxymethylene copolymer (A), amine-substituted triazine compound (B), the choline hydroxide (C), and the antioxidant (D), wherein Mn (μmol/g-POM) and Mc (μmol/g-POM) satisfy: $6.5<(Mn+Mc\times 8)<25$, $0.5<Mn<7.0$, and $0.0<Mc$.

2 Claims, No Drawings

METHOD FOR PRODUCING OXYMETHYLENE COPOLYMER RESIN COMPOSITION, AND OXYMETHYLENE COPOLYMER RESIN COMPOSITION

TECHNICAL FIELD

The present invention relates to a method for producing an oxymethylene copolymer resin composition, and an oxymethylene copolymer resin composition.

BACKGROUND ART

By utilizing its mechanical properties, friction and wear properties, drug resistance, thermal resistance, or electric properties, an oxymethylene copolymer resin composition has been broadly used as an engineering plastic in various industrial fields, such as automobiles, or electrical and electric components.

Patent Literature 1 discloses an oxymethylene copolymer resin composition, which is produced by melt kneading a predetermined amount of quaternary ammonium compound and an antioxidant such as 2,2'-methylenebis-(4-methyl-t-butylphenol) with an oxymethylene copolymer (polyacetal), wherein generation of formaldehyde, acetaldehyde and acrolein is suppressed. Patent Literature 1 also discloses an oxymethylene copolymer resin composition, to which a predetermined amount of choline hydroxide has been added without using a quaternary ammonium compound, wherein generation of formaldehyde, acetaldehyde and acrolein could not be sufficiently suppressed upon heat melting.

Patent Literature 2 discloses an oxymethylene copolymer resin composition, which is produced by adding choline hydroxide formate (triethyl-2-hydroxyethyl ammonium formate) as a quaternary ammonium compound to an oxymethylene copolymer (polyacetal copolymer), followed by melt kneading, to produce an oxymethylene copolymer resin, then adding a hydrazide compound and a weathering stabilizer to the oxymethylene copolymer resin, wherein the oxymethylene copolymer resin composition is excellent in terms of weathering stability, and further, the oxymethylene copolymer resin composition reduces the amount of formaldehyde released from a molded product thereof obtained under conditions consisting of a common injection molding pressure and a common injection speed.

Patent Literature 3 discloses an oxymethylene copolymer resin composition, which is produced by adding 0.05 to 2 parts by mass of melamine used as a thermal stabilizer and 0.01 to 1 part by mass of a hindered phenolic antioxidant to 100 parts by mass of an oxymethylene copolymer (polyacetal resin), wherein the oxymethylene copolymer resin composition is excellent in terms of friction and wear properties, generation of squeak noise is suppressed upon sliding, and further, the oxymethylene copolymer resin composition is excellent in terms of thermal stability while maintaining favorable surface smoothness of a molded product thereof.

The remaining of the hemiacetal end of an oxymethylene copolymer in such an oxymethylene copolymer resin composition may induce generation of formaldehyde in a molded product or a reduction in the viscosity caused by main chain decomposition due to formic acid. Hence, conventionally, in a stabilization step in the production of the oxymethylene copolymer resin composition, in order to promote decomposition of the hemiacetal end, a quaternary ammonium salt, an amine-substituted triazine compound, and the like have been added.

CITATION LIST

Patent Literature

Patent Literature 1: Japanese Patent Publication (Kokai) No. 2018-024861 A
Patent Literature 2: Japanese Patent Publication (Kokai) No. 2006-306944 A
Patent Literature 3: Japanese Patent Publication (Kokai) No. 2013-112727 A

SUMMARY OF INVENTION

Technical Problem

It has been desired to develop an oxymethylene copolymer resin composition used as a material for a molded product that is excellent in terms of tensile properties and thermal stability, while suppressing generation of formaldehyde, a reduction in retention viscosity, and yellowness. In addition, it has also been desired to develop an oxymethylene copolymer resin composition having the aforementioned properties, in which the additive amount of an amine-substituted triazine compound is reduced.

Considering such circumstances, it is an object of the present invention to provide a method for producing an oxymethylene copolymer resin composition, and an oxymethylene copolymer resin composition.

Solution to Problem

The present invention includes the following aspects [1] to [8].

[1] A method for producing an oxymethylene copolymer resin composition, comprising:
  adding to an oxymethylene copolymer (A), an Mn micromole of an amine-substituted triazine compound (B) per gram of the oxymethylene copolymer (A), an Mc micromole of a choline hydroxide (C) per gram of the oxymethylene copolymer (A), and 0.05 to 1.1 parts by weight of an antioxidant (D) with respect to 100 parts by weight of the oxymethylene copolymer (A), and melt kneading a mixture of the oxymethylene copolymer (A), amine-substituted triazine compound (B), the choline hydroxide (C), and the antioxidant (D), wherein
  Mn (μmol/g-POM) and Mc (μmol/g-POM) satisfy:

$6.5 < (Mn + Mc \times 8) < 25$, $0.5 < Mn < 7.0$, and $0.0 < Mc$.

[2] The production method according to the above [1], wherein the amine-substituted triazine compound is melamine.
[3] The production method according to the above [1] or [2], wherein the antioxidant is a hindered phenolic antioxidant.
[4] The production method according to the above [3], wherein the hindered phenolic antioxidant is triethylene glycol bis[3-(3-t-butyl-5-methyl-4-hydroxyphenyl)propionate] and/or pentaerythritol tetrakis[3-(3,5-di-t-butyl-4-hydroxyphenyl)propionate].

[5] An oxymethylene copolymer resin composition, comprising:
an oxymethylene copolymer (A),
an Mn micromole of an amine-substituted triazine compound (B) per gram of the oxymethylene copolymer (A),
an Mc micromole of a choline hydroxide (C) per gram of the oxymethylene copolymer (A), and
0.05 to 1.1 parts by weight of an antioxidant (D) with respect to 100 parts by weight of the oxymethylene copolymer (A), wherein
Mn (μmol/g-POM) and Mc (μmol/g-POM) satisfy:

$6.5<(Mn+Mc\times 8)<25$, $0.5<Mn<7.0$, and $0.0<Mc$.

[6] The composition according to the above [5], wherein the amine-substituted triazine compound (B) is melamine.

[7] The composition according to the above [5] or [6], wherein the antioxidant is a hindered phenolic antioxidant.

[8] The composition according to the above [7], wherein the hindered phenolic antioxidant is triethylene glycol bis[3-(3-t-butyl-5-methyl-4-hydroxyphenyl)propionate] and/or pentaerythritol tetrakis[3-(3,5-di-t-butyl-4-hydroxyphenyl)propionate].

Advantageous Effects of Invention

By using the oxymethylene copolymer resin composition of the present invention, there can be provided a molded product that is excellent in terms of tensile properties and thermal stability, while the amount of formaldehyde generated is reduced and viscosity reduction and yellowness are suppressed. Moreover, by using the oxymethylene copolymer resin composition of the present invention, there can be provided a molded product having the aforementioned properties, in which the additive amount of an amine-substituted triazine compound is reduced.

DESCRIPTION OF EMBODIMENTS

<Polyoxymethylene Copolymer Resin Composition>

The oxymethylene copolymer resin composition of the present invention comprises: an oxymethylene copolymer (A), an Mn micromole of an amine-substituted triazine compound (B) per gram of the oxymethylene copolymer (A), an Mc micromole of a choline hydroxide (C) per gram of the oxymethylene copolymer (A), and 0.05 to 1.1 parts by weight of an antioxidant (D) with respect to 100 parts by weight of the oxymethylene copolymer (A), wherein Mn (μmol/g-POM) and Mc (μmol/g-POM) satisfy: $6.5<(Mn+Mc\times 8)<25$, $0.5<Mn<7.0$, and $0.0<Mc$.

The method for producing an oxymethylene copolymer resin composition of the present invention comprises: adding to an oxymethylene copolymer (A), an Mn micromole of an amine-substituted triazine compound (B) per gram of the oxymethylene copolymer (A), an Mc micromole of a choline hydroxide (C) per gram of the oxymethylene copolymer (A), and 0.05 to 1.1 parts by weight of an antioxidant (D) with respect to 100 parts by weight of the oxymethylene copolymer (A), and melt kneading them (i.e. the mixture of the oxymethylene copolymer (A), the amine-substituted triazine compound (B), the choline hydroxide (C), and the antioxidant (D)), wherein Mn (μmol/g-POM) and Mc (μmol/g-POM) satisfy: $6.5<(Mn+Mc\times 8)<25$, $0.5<Mn<7.0$, and $0.0<Mc$.

The method and device of the melt kneading performed in the production of an oxymethylene copolymer resin composition are not particularly limited, and a known melt kneading method and a known melt kneading device are used. The melt kneading step is carried out at a temperature in which the oxymethylene copolymer is melted, or higher (in general, at 180° C. or higher. For example, the oxymethylene copolymer resin composition may be produced by adding the above-described predetermined amounts of the additives (B) to (D) to the oxymethylene copolymer (A), then performing premixing using an FM mixer (Henschel mixer), etc., then melt kneading the obtained mixture using a single- or twin-screw extruder, and then extruding the resultant in a strand shape, followed by pelletizing.

The pellets of the oxymethylene copolymer resin composition are subjected to extrusion molding or injection molding, so that the pellets can be used to produce molded products having various shapes such as a bar and a plate. After completion of the molding, the molded product can be directly used as a product, or can be further subjected to processing such as cutting so that it can be used in the production of various types of components, etc.

A molded product obtained using the oxymethylene copolymer resin composition is excellent in terms of tensile properties and thermal stability, while suppressing generation of formaldehyde, viscosity reduction, and yellowness, and thus, in comparison to conventional molded products, the additive amount of the amine-substituted triazine compound (B), such as melamine, can be reduced. Hence, the oxymethylene copolymer resin composition is more suitable as a material for food products or molded products that are contacted with human bodies.

<Oxymethylene Copolymer (A)>

The oxymethylene copolymer comprised in the oxymethylene copolymer resin composition is a polymer having an acetal bond (—O—CRH— (wherein R represents a hydrogen atom or an organic group)) as a repeating unit. In general, the oxymethylene copolymer has, as a principal constituent unit, an oxymethylene group (—OCH$_2$—) wherein R is a hydrogen atom. The oxymethylene copolymer is a copolymer (a block copolymer) comprising one or more types of repeating constituent units other than the oxymethylene group. The oxymethylene copolymer may be a terpolymer comprising two or more types of repeating constituent units other than the oxymethylene group. The oxymethylene copolymer may have a linear structure, or may also have a branched structure or a crosslinked structure, in which a glycidyl ether compound, an epoxy compound, an allyl ether compound, or the like is used as a comonomer and/or a termonomer.

The constituent unit other than the oxymethylene group is an optionally branched oxyalkylene group containing 2 to 10 carbon atoms, such as an oxyethylene group (—OCH$_2$CH$_2$— or —OCH(CH$_3$)—), an oxypropylene group (—OCH$_2$CH$_2$CH$_2$—, —OCH(CH$_3$)CH$_2$—, or —OCH$_2$CH(CH$_3$)—), or an oxybutylene group (—OCH$_2$CH$_2$CH$_2$CH$_2$—, —OCH(CH$_3$)CH$_2$CH$_2$—, —OCH$_2$CH(CH$_3$)CH$_2$—, —OCH$_2$CH$_2$CH(CH$_3$)—, —OCH(C$_2$H$_5$)CH$_2$—, or —OCH$_2$CH(C$_2$H$_5$)—). The constituent unit other than the oxymethylene group is preferably an oxyethylene group (—OCH$_2$CH$_2$—). Moreover, the content of the constituent unit other than the oxymethylene group in the oxymethylene copolymer is 0.04 to 7.50 mol %, 0.08 to 7.00 mol %, 0.10 to 6.50 mol %, or 0.15 to 6.00 mol %.

The method for producing an oxymethylene copolymer is not particularly limited, and the oxymethylene copolymer may be produced according to a known method. For example, regarding a method for producing an oxymethylene copolymer comprising, as constituent units, an oxymethylene group and an oxyalkylene group containing 2 to 4 carbon atoms, such an oxymethylene copolymer can be produced by copolymerizing the cyclic acetal of the oxymethylene group, such as a trimer (trioxane) or a tetramer (tetraoxane) of formaldehyde, with a cyclic acetal comprising an oxyalkylene group containing 2 to 5 carbon atoms, such as ethylene oxide, 1,3-dioxolane, 1,3,6-trioxocane, or 1,3-dioxepane.

<Amine-Substituted Triazine Compound (B)>

Examples of the amine-substituted triazine compound (B) comprised in the oxymethylene copolymer resin composition may include melamine, guanamine, N-butylmelamine, N-phenylmelamine, N,N-diphenylmelamine, N,N-diallylmelamine, N,N',N"-triphenylmelamine, N,N',N"-trimethylolmelamine, hexamethoxymethylmelamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, and ammeline (N,N,N',N'-tetracyanoethylbenzoguanamine). Preferably, the amine-substituted triazine compound (B) is melamine, methylolmelamine, alkylated melamine, benzoguanamine, or a water-soluble melamine-formaldehyde resin. More preferably, the amine-substituted triazine compound (B) is melamine. These amine-substituted triazine compounds may be used as a single type alone, or in combination of two or more types.

The additive amount (content) of the amine-substituted triazine compound (B) is an Mn micromole per gram of the oxymethylene copolymer (A). The Mn (µmol/g-POM) is within the range of more than 0.5 and less than 7.0 (0.5<Mn<7.0). In addition, the Mn (µmol/g-POM) is within the range of 0.5 or more and 6.5 or less (hereinafter expressed such as "0.5 to 6.5"), 0.5 to 5.5, 0.5 to 5.0, 0.5 to 4.5, 0.5 to 4.0, 0.5 to 3.5, 0.5 to 3.0, 0.5 to 2.5, 1.0 to 5.5, 1.0 to 5.0, 1.0 to 4.5, 1.0 to 4.0, 1.0 to 3.5, 1.0 to 3.0, or 1.0 to 2.5.

<Choline Hydroxide (C)>

The additive amount of the choline hydroxide (C) comprised in the oxymethylene copolymer resin composition is an Mc micromole per gram of the oxymethylene copolymer (A). The Mc (µmol/g-POM) is within the range of more than 0.0 (0.0<Mc). Otherwise, the Mc (µmol/g-POM) is within the range of 0.1 to 3.0, 0.1 to 2.5, 0.1 to 2.0, 0.2 to 3.0, 0.2 to 2.5, or 0.2 to 2.0.

The additive amount Mn (µmol/g-POM) of the amine-substituted triazine compound (B) and the additive amount Mc (µmol/g-POM) of the choline hydroxide (C) satisfy 6.5<(Mn+Mc×8)<25. In other words, a total value of Mn and 8 times of Mc (i.e. Mc×8) is within the range of more than 6.5 and less than 25.

<Antioxidant (D)>

The oxymethylene copolymer resin composition comprises the antioxidant (D). The antioxidant (D) is a phenolic antioxidant, a phosphorus antioxidant, or a sulfur antioxidant, and it is preferably a hindered phenolic antioxidant.

Examples of the hindered phenolic antioxidant (D) may include triethylene glycol bis[3-(3-t-butyl-5-methyl-4-hydroxyphenyl)propionate], 2,2'-methylene-bis(4-methyl-6-t-butylphenol), 4,4'-methylene-bis(2,6-di-t-butylphenol), 1,3,5-trimethyl-2,4,6-tris(3,5-di-t-butyl-4-hydroxybenzyl)benzene, 3,5-di-t-butyl-4-hydroxybenzyldimethylamine, distearyl-3,5-di-t-butyl-4-hydroxybenzyl phosphonate, diethyl-3,5-di-t-butyl-4-hydroxybenzylphosphonate, 2,6,7-trioxa-1-phospha-bicyclo[2.2.2]octo-4-yl-methyl-3,5-di-t-butyl-4-hydroxyhydrocinnamate, 3,5-di-t-butyl-4-hydroxyphenyl-3,5-distearyl-thiotriazylamine, 2-(2-hydroxy-3,5-di-t-butylphenyl)-5-chlorobenzotriazole, 2,6-di-t-butyl-4-hydroxymethylphenol, 2,4-bis-(n-octylthio)-6-(4-hydroxy-3,5-di-t-butylanilino)-1,3,5-triazine, N,N'-hexamethylenebis(3,5-di-t-butyl-4-hydroxy-hydrocinnamide), octadecyl-3-(3,5-di-t-butyl-4-hydroxyphenyl)propionate, 1,6-hexanediol-bis[3-(3,5-di-t-butyl-4-hydroxyphenyl)propionate], pentaerythritol tetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3,5-di-t-butyl-4-hydroxyphenyl)propionate], and 2,2'-thiodiethyl-bis[3-(3,5-di-t-butyl-4-hydroxyphenyl)propionate]. The hindered phenolic antioxidant (D) is preferably triethylene glycol bis [3-(3-t-butyl-5-methyl-4-hydroxyphenyl)propionate], 1,3,5-trimethyl-2,4,6-tris(3,5-di-t-butyl-4-hydroxybenzyl)benzene, pentaerythritol tetrakis[3-(3,5-di-t-butyl-4-hydroxyphenyl)propionate], or a combination thereof. The hindered phenolic antioxidant (D) is more preferably triethylene glycol bis[3-(3-t-butyl-5-methyl-4-hydroxyphenyl)propionate] and/or pentaerythritol tetrakis[3-(3,5-di-t-butyl-4-hydroxyphenyl)propionate]. These hindered phenolic antioxidants may be used as a single type alone, or may also be used in combination of two or more types.

The additive amount of the antioxidant (D) is within the range of 0.05 to 1.1 parts by weight, based on 100 parts by weight of the oxymethylene copolymer (A). Otherwise, the additive amount of the antioxidant (D) is within the range of 0.05 to 0.8 parts by weight, 0.05 to 0.6 parts by weight, 0.05 to 0.4 parts by weight, 0.1 to 0.8 parts by weight, 0.1 to 0.6 parts by weight, or 0.1 to 0.4 parts by weight, based on 100 parts by weight of the oxymethylene copolymer (A).

<Optional Components>

To the oxymethylene copolymer resin composition, optional additives such as other stabilizers, nucleating agents, mold release agents, fillers, pigments, lubricants, plasticizers, ultraviolet absorbers, flame retardants, or flame retardant auxiliaries may be added, as necessary, within a range that does not impair the purpose of the present invention. Examples of such optional additives may include glass fibers, glass flakes, glass beads, wollastonite, mica, talc, boron nitride, calcium carbonate, kaoline, silicon dioxide, clay, asbestos, silica, diatomaceous earth, graphite, molybdenum disulfide, glass fibers, milled fibers, potassium titanate fibers, poron fibers, carbon fibers, aramid fibers, potassium titanate whisker, carbon black, and pigment.

EXAMPLES

Hereinafter, some examples of the present invention will be described. The materials, etc. used in the Examples and Comparative Examples are shown below.

<Oxymethylene Copolymer (A)>

An oxymethylene copolymer (A) was prepared by the following method and was then used in the Examples and Comparative Examples described below.

200 kg/hr Trioxane, 8.0 kg/hr 1,3-dioxolane, a boron trifluoride diethyl etherate benzene solution (0.6 mol/kg) used as a catalyst in an amount of 0.05 mmol with respect to 1 mol of the trioxane, and a methylal benzene solution (65 weight %) used as a molecular weight modifier in an amount of 500 ppm with respect to the trioxane were continuously added to a biaxial continuous polymerization machine having a self-cleaning paddle with a jacket whose temperature had been set at 85° C., and were continuously polymerized such that the retention time became 15 minutes. Thereafter, a benzene solution containing 25% by weight of triphenylphosphine was added to the generated polymer to result in an amount of 2 mol with respect to 1 mol of the aforementioned boron trifluoride diethyl etherate, and the catalyst was inactivated and crushed, so as to obtain an oxymethylene copolymer (a crude oxymethylene copolymer). The obtained oxymethylene copolymer was used in the Examples and Comparative Examples described below.

<Additives>

The following additives were added to the oxymethylene copolymer (A) in the Examples and Comparative Examples described below.

The amine-substituted triazine compound (B) that was melamine (Mitsui Chemicals, Inc.).
The choline hydroxide (C) that was manufactured by Tokyo Chemical Industry Co., Ltd.
The antioxidant (D) that was triethylene glycol bis[3-(3-t-butyl-5-methyl-4-hydroxyphenyl)propionate] (Irganox (registered trademark) 245, BASF Japan) or pentaerythritol tetrakis [3-(3,5-di-t-butyl-4-hydroxyphenyl)propionate] (Irganox (registered trademark) 1010, BASF Japan).
Choline acetate that was manufactured by Tokyo Chemical Industry Co., Ltd.
Choline tartrate that was manufactured by Tokyo Chemical Industry Co., Ltd.
TEAH (tetraethyl ammonium hydroxide) that was manufactured by Tokyo Chemical Industry Co., Ltd.
TBAA (tetrabutyl ammonium acetate) that was manufactured by Tokyo Chemical Industry Co., Ltd.

Examples 1 to 18

In Example 1 of the present invention, 4.0 (μmol/g-POM) of melamine used as an amine-substituted triazine compound (B), 0.4 (μmol/g-POM) of a choline hydroxide (C), and triethylene glycol bis[3-(3-t-butyl-5-methyl-4-hydroxyphenyl)propionate] used as an antioxidant (D) in an amount of 0.3 parts by weight based on 100 parts by weight of the oxymethylene copolymer (A), were added to an oxymethylene copolymer (A), and then, premixing was performed using an FM mixer (Henschel mixer) (manufactured by NIPPON COKE & ENGINEERING CO., LTD.). Thereafter, the obtained mixture was subjected to continuous extrusion molding using a same-direction rotating twin-screw extruder (inner diameter: 30 mm, L/D=25), while devolatizing at a cylinder temperature of 240° C. under a reduced pressure of 21.3 kPa, so as to obtain an oxymethylene copolymer resin composition in the form of pellets.

In each of Examples 2 to 15, 17 and 18 of the present invention, an oxymethylene copolymer resin composition was obtained in the form of pellets according to the same method and under the same conditions as those in Example 1, with the exception that the additive amounts of the melamine (B), the choline hydroxide (C), and the antioxidant (D) were changed in accordance with the amounts shown in Table 1. In Example 16, an oxymethylene copolymer resin composition was obtained in the form of pellets according to the same method as that in Example 1, with the exceptions that pentaerythritol tetrakis[3-(3,5-di-t-butyl-4-hydroxyphenyl)propionate] was used as an antioxidant (D), and that the additive amounts of the melamine (B), the choline hydroxide (C), and the antioxidant (D) were changed in accordance with the amounts shown in Table 1.

Comparative Examples 1 to 13

In each of Comparative Examples 1 to 13, an oxymethylene copolymer resin composition was prepared in the form of pellets according to the same method and under the same conditions as those in Example 1, with the exception that the additives and the additive amounts shown in Table 1 were applied. In particular, in Comparative Examples 1 and 5, the melamine (B) was not added; in Comparative Examples 2 and 3, the choline hydroxide (C) was not added; and in Comparative Example 4, the melamine (B) and the choline hydroxide (C) were not added. In addition, in Comparative Examples 6 to 8, the melamine (B), the choline hydroxide (C), and the antioxidant (D) were added, but the range of the additive amount Mn of the melamine (0.5<Mn<7.0) or the range of (Mn+Mc×8) (more than 6.5 and less than 25) were not satisfied. In Comparative Examples 9 to 12, the component (C) satisfied the additive amount Mc and the range of (Mn+Mc×8). However, the component (C) was not choline hydroxide, but choline acetate, choline tartrate, TEAH, or TBAA was added. In Comparative Example 13, the antioxidant (D) was not added.

TABLE 1

| | Additives and additive amounts used in Examples and Comparative Examples | | | | | | | | | | |
|---|---|---|---|---|---|---|---|---|---|---|---|
| | Additives | Unit | Example 1 | Example 2 | Example 3 | Example 4 | Example 5 | Example 6 | Example 7 | Example 8 | Example 9 |
| (D) | Irganox 245 | phr | 0.3 | 0.3 | 0.3 | 0.3 | 0.3 | 0.3 | 0.3 | 0.3 | 0.3 |
| | Irganox 1010 | phr | | | | | | | | | |
| (B) | Melamine (Mn) | μmol/g-POM | 4.0 | 4.0 | 4.0 | 4.0 | 4.0 | 6.3 | 6.3 | 6.3 | 6.3 |
| (C) | Choline hydroxide (Mc) | μmol/g-POM | 0.4 | 0.8 | 1.2 | 1.7 | 2.5 | 0.4 | 1.2 | 2.1 | 0.2 |
| | Choline acetate (Mc) | μmol/g-POM | | | | | | | | | |
| | Choline tartrate (Mc) | μmol/g-POM | | | | | | | | | |
| | TEAH (Mc) | μmol/g-POM | | | | | | | | | |
| | TBAA (Mc) | μmol/g-POM | | | | | | | | | |
| | Mn + Mc × 8 | μmol/g-POM | 7.2 | 10.4 | 13.6 | 17.6 | 24.0 | 9.5 | 15.9 | 23.1 | 7.9 |

TABLE 1-continued

Additives and additive amounts used in Examples and Comparative Examples

|  | Additives | Unit | Example 10 | Example 11 | Example 12 | Example 13 | Example 14 | Example 15 | Example 16 | Example 17 | Example 18 |
|---|---|---|---|---|---|---|---|---|---|---|---|
| (D) | Irganox 245 | phr | 0.3 | 0.3 | 0.3 | 0.3 | 0.3 | 0.3 |  | 0.1 | 1.0 |
|  | Irganox 1010 | phr |  |  |  |  |  |  | 0.3 |  |  |
| (B) | Melamine (Mn) | μmol/g-POM | 1.0 | 1.0 | 1.0 | 2.0 | 2.0 | 2.0 | 4.0 | 1.0 | 1.0 |
| (C) | Choline hydroxide (Mc) | μmol/g-POM | 1.2 | 0.8 | 2.8 | 0.8 | 1.5 | 2.0 | 1.2 | 0.8 | 0.8 |
|  | Choline acetate (Mc) | μmol/g-POM |  |  |  |  |  |  |  |  |  |
|  | Choline tartrate (Mc) | μmol/g-POM |  |  |  |  |  |  |  |  |  |
|  | TEAH (Mc) | μmol/g-POM |  |  |  |  |  |  |  |  |  |
|  | TBAA (Mc) | μmol/g-POM |  |  |  |  |  |  |  |  |  |
|  | Mn + Mc × 8 | μmol/g-POM | 10.6 | 7.4 | 23.4 | 8.4 | 14.0 | 18.0 | 13.6 | 7.4 | 7.4 |

|  | Additives | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| (D) | Irganox 245 | phr | 0.3 | 0.3 | 0.3 | 0.3 | 0.3 | 0.3 | 0.3 | 0.3 | 0.3 |
|  | Irganox 1010 | phr |  |  |  |  |  |  |  |  |  |
| (B) | Melamine (Mn) | μmol/g-POM |  | 6.3 | 22.2 |  |  | 11.9 | 4.0 | 2.0 | 4.0 |
| (C) | Choline hydroxide (Mc) | μmol/g-POM | 1.2 |  |  |  | 0.4 | 1.2 | 3.0 | 0.2 |  |
|  | Choline acetate (Mc) | μmol/g-POM |  |  |  |  |  |  |  |  |  |
|  | Choline tartrate (Mc) | μmol/g-POM |  |  |  |  |  |  |  |  |  |
|  | TEAH (Mc) | μmol/g-POM |  |  |  |  |  |  |  |  | 0.7 |
|  | TBAA (Mc) | μmol/g-POM |  |  |  |  |  |  |  |  |  |
|  | Mn + Mc × 8 | μmol/g-POM | 9.6 | 6.3 | 22.2 | 0 | 3.2 | 21.5 | 28.0 | 3.6 | 9.6 |

|  | Additives | Unit | Comparative Example 10 | Comparative Example 11 | Comparative Example 12 | Comparative Example 13 |
|---|---|---|---|---|---|---|
| (D) | Irganox 245 | phr | 0.3 | 0.3 | 0.3 |  |
|  | Irganox 1010 | phr |  |  |  |  |
| (B) | Melamine (Mn) | μmol/g-POM | 4.0 | 4.0 | 4.0 | 4.0 |
| (C) | Choline hydroxide (Mc) | μmol/g-POM |  |  |  | 1.2 |
|  | Choline acetate (Mc) | μmol/g-POM |  | 1.8 |  |  |
|  | Choline tartrate (Mc) | μmol/g-POM |  |  | 0.6 |  |
|  | TEAH (Mc) | μmol/g-POM |  |  |  |  |
|  | TBAA (Mc) | μmol/g-POM | 0.7 |  |  |  |
|  | Mn + Mc × 8 | μmol/g-POM | 9.6 | 18.4 | 8.8 | 13.6 |

The pellets of the oxymethylene copolymer resin composition prepared in each of the Examples and Comparative Examples were evaluated in terms of the following properties. The results are shown in Table 2.

[Amount of HCHO Generated]

Using the molding machine SAV-30-30 manufactured by SANJO SEIKI Co., Ltd., the pellets of the oxymethylene copolymer resin composition were molded at a cylinder temperature of 230° C. into a disk having a diameter of 50 mm×thickness of 3 mm that was to be used as a test piece. On the day following the molding, the amount of HCHO generated was measured according to the method described in quantification of the amount of formaldehyde released in accordance with the Verband der Automobilindustrie VDA275 (automobile interior part–modified flask method) (wherein the unit was the amount of formaldehyde released (microgram) (μg/g-POM) per gram of the oxymethylene copolymer resin composition)). As the value of the amount of HCHO generated is decreased, generation of formaldehyde is favorably suppressed. In the present invention, the amount of HCHO generated (μg/g-POM) that was less than 100 was determined to be satisfactory.

[ΔMFR After Retention for 24 Minutes]

The pellets of the oxymethylene copolymer resin composition were melted and retained for 24 minutes in the cylinder of the injection molding machine IS75E-2B manufactured by Toshiba Machine Co., Ltd. that had been heated to 240° C., and were then subjected to injection molding at a mold temperature of 85° C., so that the reaction mixture was molded into a flat plate having a size of 90 mm×50 mm×a thickness of 3.3 mm (molded piece). The melt flow rate (MFR) (g/10 minutes) of the molded piece was measured in accordance with ISO1133. On the other hand, also regarding the pellets of the oxymethylene copolymer resin composition that was not subjected to molding, the melt flow rate (MFR) was measured in accordance with ISO1133 (unit: g/10 minutes). The value obtained by subtracting the value of the melt flow rate (MFR) of the pellets before the molding from the value of the melt flow rate (MFR) of the molded piece obtained after the molding was determined to be ΔMFR (g/10 minutes). As the value of the AMFR is decreased, the viscosity reduction caused by molding is favorably suppressed. In the present invention, the value of ΔMFR (g/10 minutes) that was less than 5.0 was determined to be satisfactory.

[Δb After Retention for 36 Minutes]

The pellets of the oxymethylene copolymer resin composition were melted and retained for 1 minute in the cylinder of the injection molding machine IS75E-2B manufactured by Toshiba Machine Co., Ltd. that had been heated to 240° C., and were then subjected to injection molding at a mold temperature of 85° C., so that the reaction mixture was molded into a flat plate having a size of 90 mm×50 mm×a thickness of 3.3 mm (molded piece 1). The b value that was the hue of the molded piece 1 was measured using a spectral color difference meter (manufactured by NIPPON DENSHOKU INDUSTRIES Co., Ltd.; SE-2000). As the b value is decreased, it shows that the yellowness is weak, and that the hue becomes favorable. Likewise, the pellets of the oxymethylene copolymer resin composition were melted and retained for 36 minutes in the cylinder of the injection molding machine IS75E-2B manufactured by Toshiba Machine Co., Ltd. that had been heated to 240° C., and were then subjected to injection molding at a mold temperature of 85° C., so that the reaction mixture was molded into a flat plate having a size of 90 mm×50 mm×a thickness of 3.3 mm (molded piece 2). The b value that was the hue of the molded piece 2 was measured using a spectral color difference meter (manufactured by NIPPON DENSHOKU INDUSTRIES Co., Ltd.; SE-2000). The value obtained by subtracting the b value of the molded piece 1 from the b value of the molded piece 2 was determined to be Δb. As the value of the Δb is decreased, the yellowness is favorably suppressed. In the present invention, the value of Δb that was less than 2.5 was determined to be satisfactory.

[Tensile Elongation]

The pellets of the oxymethylene copolymer resin composition were melted and heated for 1 minute in the cylinder of the injection molding machine SE75S manufactured by Sumitomo Heavy Industries, Ltd. that had been heated to 200° C., and were then subjected to injection molding at a mold temperature of 90° C., so as to produce a molded piece. Thereafter, using the STROGRAPH AP2 manufactured by Toyo Seiki Seisaku-sho, Ltd., the tensile elongation of the molded piece was measured (unit: %) in accordance with ISO527 and ISO527-2. As the value of the tensile elongation is increased, the tensile properties become excellent, so that the molded piece becomes favorable. In the present invention, a tensile elongation of 20% or more was determined to be satisfactory.

[M Value]

The pellets (2 g) of the oxymethylene copolymer resin composition were placed in a test tube, and the inside of the test tube was then substituted with nitrogen. Subsequently, the weight reduction percentage was measured, after the pellets had been heated under a reduced pressure of 1.3 KPa at 222° C. for 2 hours. As the M value is decreased, thermal stability is high, so that the oxymethylene copolymer resin composition becomes favorable. In the present invention, an M value of less than 0.55% was determined to be satisfactory.

TABLE 2

Evaluation of properties of Examples and Comparative Examples

| Properties | Unit | Example 1 | Example 2 | Example 3 | Example 4 | Example 5 | Example 6 | Example 7 | Example 8 | Example 9 |
|---|---|---|---|---|---|---|---|---|---|---|
| Amount of HCHO generated | μg/g-POM | 71 | 65 | 59 | 51 | 32 | 65 | 56 | 46 | 68 |
| ΔMFR after retention for 24 minutes | g/10 min | 4.1 | 3.4 | 3.1 | 2.7 | 2.0 | 3.2 | 3.1 | 1.2 | 3.5 |
| Δb after retention for 36 minutes | — | 1.2 | 1.4 | 1.5 | 1.8 | 2.1 | 1.1 | 1.7 | 2.2 | 1.1 |
| Tensile elongation | % | 29.5 | 29.4 | 29.3 | 29.3 | 29.2 | 29.5 | 29.4 | 29.2 | 30.0 |
| M value | % | 0.47 | 0.45 | 0.41 | 0.34 | 0.30 | 0.46 | 0.43 | 0.36 | 0.50 |

| Properties | Unit | Example 10 | Example 11 | Example 12 | Example 13 | Example 14 | Example 15 | Example 16 | Example 17 | Example 18 |
|---|---|---|---|---|---|---|---|---|---|---|
| Amount of HCHO generated | μg/g-POM | 71 | 85 | 30 | 79 | 62 | 51 | 55 | 92 | 60 |
| ΔMFR after retention for 24 minutes | g/10 min | 3.7 | 4.1 | 3.1 | 3.9 | 3.6 | 3.4 | 3.0 | 4.8 | 4.1 |
| Δb after retention for 36 minutes | — | 0.6 | 0.6 | 0.4 | 0.7 | 0.8 | 0.8 | 1.4 | 0.6 | 0.6 |
| Tensile elongation | % | 28.1 | 28.2 | 28.0 | 28.8 | 28.6 | 26.3 | 29.2 | 28.2 | 28.2 |
| M value | % | 0.46 | 0.51 | 0.32 | 0.52 | 0.43 | 0.34 | 0.40 | 0.53 | 0.45 |

| Properties | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Amount of HCHO generated | μg/g-POM | 75 | 71 | 59 | 181 | 107 | 42 | 30 | 95 | 81 |
| ΔMFR after retention for 24 minutes | g/10 min | 4.0 | 3.8 | 3.7 | 6.2 | 5.0 | 2.5 | 1.8 | 4.2 | 5.8 |
| Δb after retention for 36 minutes | — | 0.3 | 1.0 | 2.0 | 0.5 | 0.3 | 3.3 | 2.5 | 0.8 | 1.1 |
| Tensile elongation | % | 12.5 | 29.6 | 19.9 | 12.8 | 12.7 | 29.4 | 28.9 | 28.1 | 29.5 |
| M value | % | 0.53 | 0.55 | 0.49 | 1.27 | 0.56 | 0.42 | 0.30 | 0.75 | 0.49 |

| Properties | Unit | Comparative Example 10 | Comparative Example 11 | Comparative Example 12 | Comparative Example 13 |
|---|---|---|---|---|---|
| Amount of HCHO generated | μg/g-POM | 57 | 30 | 56 | 110 |
| ΔMFR after retention for 24 minutes | g/10 min | 6.2 | 4.4 | 3.3 | 5.2 |

TABLE 2-continued

| Evaluation of properties of Examples and Comparative Examples | | | | | |
|---|---|---|---|---|---|
| Δb after retention for 36 minutes | — | 1.0 | 3.1 | 4.9 | 1.5 |
| Tensile elongation | % | 29.4 | 29.3 | 29.3 | 29.0 |
| M value | % | 0.54 | 0.40 | 0.46 | 1.38 |

All of the pellets of the oxymethylene copolymer resin compositions prepared in Examples 1 to 18 satisfied acceptability criteria, in terms of all of the properties, namely, the amount of HCHO generated, ΔMFR after retention for 24 minutes, Δb after retention for 36 minutes, tensile elongation, and M value.

In contrast, Comparative Example 1 did not satisfy the acceptability criterion regarding tensile elongation; Comparative Example 2 did not satisfy the acceptability criterion regarding M value; Comparative Example 3 did not satisfy the acceptability criterion regarding tensile elongation; and Comparative Examples 4 and 5 did not satisfy the acceptability criteria regarding the amount of HCHO generated, ΔMFR after retention for 24 minutes, tensile elongation, and M value. Moreover, Comparative Examples 6 and 7 did not satisfy the acceptability criterion regarding Δb after retention for 36 minutes; Comparative Example 8 did not satisfy the acceptability criterion regarding M value; Comparative Examples 9 and 10 did not satisfy the acceptability criterion regarding ΔMFR after retention for 24 minutes; Comparative Examples 11 and 12 did not satisfy the acceptability criterion regarding Δb after retention for 36 minutes; and Comparative Example 13 did not satisfy the acceptability criteria regarding the amount of HCHO generated, ΔMFR after retention for 24 minutes, and M value.

The invention claimed is:

1. A method for producing an oxymethylene copolymer resin composition, comprising:
adding to an oxymethylene copolymer (A), an Mn micromole of an amine-substituted triazine compound (B) per gram of the oxymethylene copolymer (A), an Mc micromole of a choline hydroxide (C) per gram of the oxymethylene copolymer (A), and 0.1 to 1.0 parts by weight of an antioxidant (D) with respect to 100 parts by weight of the oxymethylene copolymer (A), and melt kneading a mixture of the oxymethylene copolymer (A), amine-substituted triazine compound (B), the choline hydroxide (C), and the antioxidant (D), wherein Mn (μmol/g-POM) and Mc (μmol/g-POM) satisfy:

6.5<(Mn+Mc×8)<25,

Mn is from 1.0 to 2.0, and

Mc is from 0.8 to 2.8:

the amine-substituted triazine compound (B) is melamine; and
the antioxidant (D) is triethylene glycol bis[3-(34-butyl-5-methyl-4-hydroxyphenyl)propionate].

2. An oxymethylene copolymer resin composition, comprising:
an oxymethylene copolymer (A),
an Mn micromole of an amine-substituted triazine compound (B) per gram of the oxymethylene copolymer (A),
an Mc micromole of a choline hydroxide (C) per gram of the oxymethylene copolymer (A), and
0.1 to 1.0 parts by weight of an antioxidant (D) with respect to 100 parts by weight of the oxymethylene copolymer (A), wherein
Mn (μmol/g-POM) and Mc (μmol/g-POM) satisfy:

6.5<(Mn+Mc×8)<25,

Mn is from 1.0 to 2.0, and

Mc is from 0.8 to 2.8;

the amine-substituted triazine compound (B) is melamine; and
the antioxidant (D) is triethylene glycol bis[3-(3-t-butyl-5-methyl-4-hydroxyphenyl)propionate].

* * * * *